United States Patent
Plondke (10) Patent No.: US 8,479,207 B2
(45) Date of Patent: Jul. 2, 2013

(54) PRIORITY INHERITANCE IN MULTITHREADED SYSTEMS

(75) Inventor: Erich J. Plondke, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 219 days.

(21) Appl. No.: 13/035,184

(22) Filed: Feb. 25, 2011

(65) Prior Publication Data

US 2012/0222035 A1 Aug. 30, 2012

(51) Int. Cl.
*G06F 9/46* (2006.01)
(52) U.S. Cl.
USPC .......................................... 718/103
(58) Field of Classification Search
USPC .......................................... 718/103
See application file for complete search history.

(56) References Cited

U.S. PATENT DOCUMENTS

| | | | |
|---|---|---|---|
| 5,515,538 A | 5/1996 | Kleiman | |
| 6,904,483 B2 * | 6/2005 | Koning et al. | 710/244 |
| 7,788,668 B2 * | 8/2010 | Barker | 718/103 |
| 2006/0282836 A1 | 12/2006 | Barker | |
| 2008/0104600 A1 | 5/2008 | May | |
| 2008/0168454 A1 * | 7/2008 | Choi et al. | 718/103 |
| 2009/0307696 A1 | 12/2009 | Vals et al. | |
| 2010/0257534 A1 * | 10/2010 | Cismas et al. | 718/103 |

FOREIGN PATENT DOCUMENTS

EP 1942413 A2 7/2008

OTHER PUBLICATIONS

Abraham Silberschatz, Peter B Galvin, Greg Gagne, Operating System Concepts, 2009, 8th Edition, John Wiley & Son, Inc, p. 49-53.*
John L. Hennessy, David A Peterson, Computer Organization and Design: The Hardware/Software Interface, 2005, 3rd Edition, Elsevier Inc. p. 468-473.*
John L. Hennessy, David A Peterson, Computer Architecture: A Quantitative Approach, 2007, 4th Edition, Elsevier Inc. p. 196-204.*
International Search Report and Written Opinion—PCT/US2012/026830—ISA/EPO —Jun. 29, 2012.

* cited by examiner

*Primary Examiner* — Emerson Puente
*Assistant Examiner* — Charlie Sun
(74) *Attorney, Agent, or Firm* — Peter Michael Kamarchik; Nicholas J. Pauley; Joseph Agusta (57) ABSTRACT

A method includes determining that a first task having a first priority is blocked from execution at a multithreaded processor by a second task having a second priority that is lower than the first priority. A temporary priority of the second task is set to be equal to an elevated priority, such that in response to the second task being preempted from execution by another task, the second task is rescheduled for execution based on the elevated priority identified by the temporary priority.

28 Claims, 8 Drawing Sheets

PRIORITY INHERITANCE IN MULTITHREADED SYSTEMS

I. FIELD

The present disclosure is generally related to priority inheritance in multithreaded systems.

II. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet Protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player.

The processors in such portable computing devices may be operable to execute computing threads in a prioritized order. Executing computing threads in a prioritized order typically involves preempting lower priority threads with higher priority threads. When threads at a computing device can be assigned different priorities, priority inversion may occur in certain conditions. For example, priority inversion may occur when threads of differing priority compete for a common resource, such as memory or a bus. Priority inversion may result in operating inefficiencies and potential deadlock. For example, a high priority thread may wait on a resource that is being used by a low priority thread. If other medium priority threads exist in the system, the low priority thread and by extension, the waiting high priority thread) may become preempted by the medium priority threads. Due to the preemption, the low priority thread may not be able to complete execution and free the resource so that the high priority thread may acquire the resource and continue execution. Since medium priority threads are effectively preempting a high priority thread, the priorities of the medium priority threads and the high priority thread may be said to be "inverted."

III. SUMMARY

Priority inheritance is a technique that may be used for priority inversion avoidance. In typical priority inheritance, when a waiting high priority thread (e.g., priority=1) blocks on a low priority thread. (e.g., priority=3), the low priority thread "inherits" the priority of the blocking high priority thread (e.g., the low priority thread inherits a priority=1). This inheritance keeps medium priority threads (e.g., priority=2) from causing priority inversion. However, priority inheritance may be complicated and difficult to implement in multithreaded or multiprocessor systems, because elevating the priority of the low priority thread may require modifying numerous thread scheduling data structures, thereby consuming processor resources. Priority inheritance may be ill-suited for application in mobile computing devices, such as wireless phones, where battery life and processor time may be at a premium.

The present disclosure describes priority inheritance in multithreaded and multiprocessor systems (e.g., "lazy" priority inheritance). When it is determined that a first task is blocked from execution by a second lower priority task, the second task may inherit a temporary priority equal to the priority of the first task. Alternately, the temporary priority of the second task may be set to an elevated priority that represents a highest possible task priority in the system. The temporary priority may be set without modifying the contents of thread scheduling data structures. During normal operation when priority inversion does not occur, the "lazy" techniques disclosed herein may provide low-cost techniques, since only a temporary priority is set and no scheduling data is affected. However, if the second task is preempted by another task, the second task may be rescheduled for execution using the temporary priority. The second task may execute at the higher temporary priority, enabling the system to make progress towards executing the first task.

In a particular embodiment, a method includes determining that a first task having a first priority is blocked from execution at a multithreaded processor by a second task having a second priority that is lower than the first priority. The method also includes setting a temporary priority of the second task to be equal to an elevated priority that is higher than the second priority such that in response to the second task being preempted from execution by another task, the second task is rescheduled for execution based on the elevated priority identified by the temporary priority.

In another particular embodiment, an apparatus includes a multithreaded processor, a memory, and an operating system. The operating system is executable by the multithreaded processor to determine that a first task having a first priority is blocked from execution at the multithreaded processor by a second task having a second priority that is lower than the first priority. The operating system is also executable to set a temporary priority of the second task to be equal to an elevated priority that is higher than the second priority, such that in response to the second task being preempted from execution at the multithreaded processor by another task, the second task is rescheduled for execution based on the elevated priority identified by the temporary priority.

In another particular embodiment, the memory stores a ready list and a run list. The ready list identifies tasks that are ready to be executed at the multithreaded processor and the run list identifies tasks that are scheduled for execution at the multithreaded processor. The temporary priority of the second task is set without modifying the contents of the ready list or the run list.

In a lazy priority inheritance implementation, the elevated priority may be equal to the first priority. In a lazy priority ceiling implementation, the elevated priority may be a priority ceiling that represents a highest possible task priority of the operating system.

Particular advantages provided by at least one of the disclosed embodiments include a priority inversion technique that may be implemented in multithreaded or multiprocessor systems without modifying the contents of task scheduling data structures.

Other aspects, advantages, and features of the present disclosure will become apparent after review of the entire application, including the following sections: Brief Description of the Drawings, Detailed Description, and the Claims.

V. DETAILED DESCRIPTION

Figure 1:
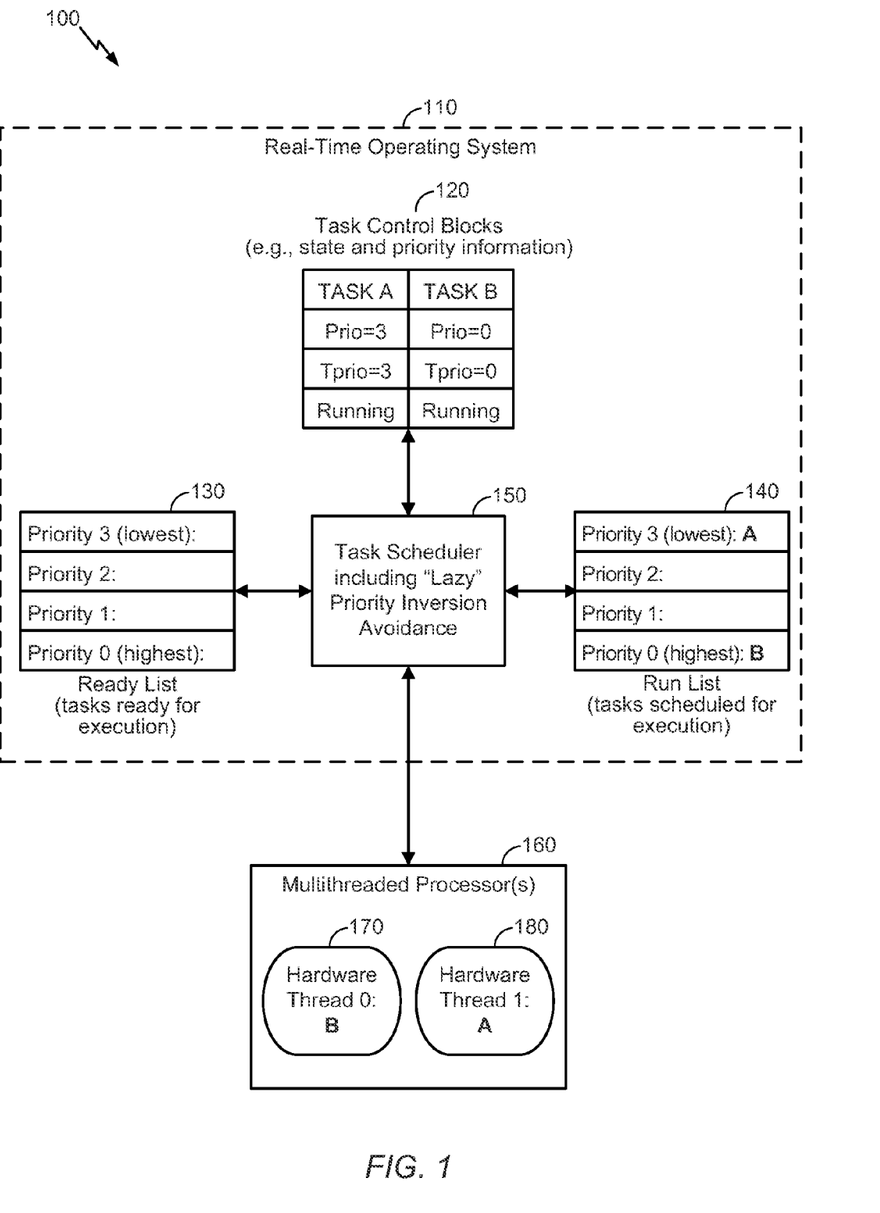
FIG. 1 is a block diagram of an illustrative embodiment of a system operable to perform priority inheritance.

Referring to FIG. 1, a block diagram of an illustrative embodiment of a system that is operable to perform priority inheritance is disclosed and generally designated 100. The system 100 may include an operating system (e.g., an illustrative real-time operating system 110) executable by one or more multithreaded processors 160. It should be noted that any number of processors may exist in the system 100. It should also be noted that although FIG. 1 is described herein with reference to a real-time operating system, priority inheritance as disclosed herein may also be implemented in non real-time operating systems.

In a particular embodiment, the operating system 110 supports interleaved multithreaded execution of tasks. The operating system 110 may maintain task control blocks 120 that store state and priority information of the tasks. For example, as illustrated in FIG. 1, the task control blocks 120 may store state and priority information for two tasks A and B. The task A may be a low priority task having a priority of 3, and the task B may be a high priority task having a priority of 0. The tasks A and B may have temporary priorities that are initially equal to 3 and 0, respectively. In a particular embodiment, the priorities and temporary priorities are members of an object-oriented thread class that is used to implement multithreading at the system 100. For example, "priority" and "temporary priority" may be single-byte data members of thread objects. In a particular embodiment, low priority tasks at the system 100 include maintenance tasks, background tasks, profiling tasks, user interface tasks, or any combination thereof. High priority tasks at the system 100 include device tasks, critical system tasks, or any combination thereof. It should be noted that although the task control blocks 120 depict two tasks, any number of tasks may be present in the system 100. It should also be noted that different number schemes may be used to designate priority (e.g., 3 may designate a high priority and 0 may designate a low priority).

The task control blocks 120 may further indicate whether particular tasks are running, ready for execution, or blocked from execution. For example, as illustrated in FIG. 1, the tasks A and B may both be designated as "Running," since a first hardware thread (e.g., "hardware thread 0") 170 of the multithreaded processors 160 is executing the task B undo second hardware thread "hardware thread 1") 180 is executing the task A.

The operating system 110 may also maintain a ready list 130 and a run list 140 that are operable to store scheduling data associated with scheduled tasks. The ready list 130 may identify tasks that are ready to be executed at the multithreaded processors 160. In a particular embodiment, the ready list 130 includes one or more slots for each priority level provided by the system 100. For example, the ready list 130 may have one or more slots for priority 0 (a highest task priority at the system 100), priority 1, priority 2, and priority 3 (a lowest task priority at the system 100).

The run list 140 may identify tasks that are scheduled for execution at the multithreaded processors 160. In a particular embodiment, the run list 140 also includes one or more slots for each priority level provided by the system 100. In the particular embodiment illustrated in FIG. 1, the run list 140 includes the tasks A and B since the tasks A and B are being executed by the hardware threads 180 and 170, respectively.

In a particular embodiment, each of the multithreaded processors 160 includes a plurality of hardware threads. Each hardware thread may be operable to execute a scheduled task independent of other hardware threads, thereby providing task execution parallelism at the system 100. For example, the first hardware thread 170 may execute the task B while the second hardware thread 180 concurrently executes the task A.

The operating system 110 may include a task scheduler 150 that is operable to maintain the ready list 130, maintain the run list 140, and schedule tasks for execution at the hardware threads 170 and 180. The task scheduler 150 may also be operable to read and update the task control blocks 120. The task scheduler 150 may implement "lazy" priority inheritance as described herein. For example, the task scheduler 150 may be operable to determine that a first task having a first priority is blocked from execution by a second task having a second priority that is lower than the first priority. The task scheduler may also be operable to set a temporary priority of the second task to be equal to the first priority or to an elevated priority, such that in response to determining that the second task is preempted from execution by another task, the task scheduler 150 reschedules the second task for execution based on the first priority or the elevated priority.

Figure 2:
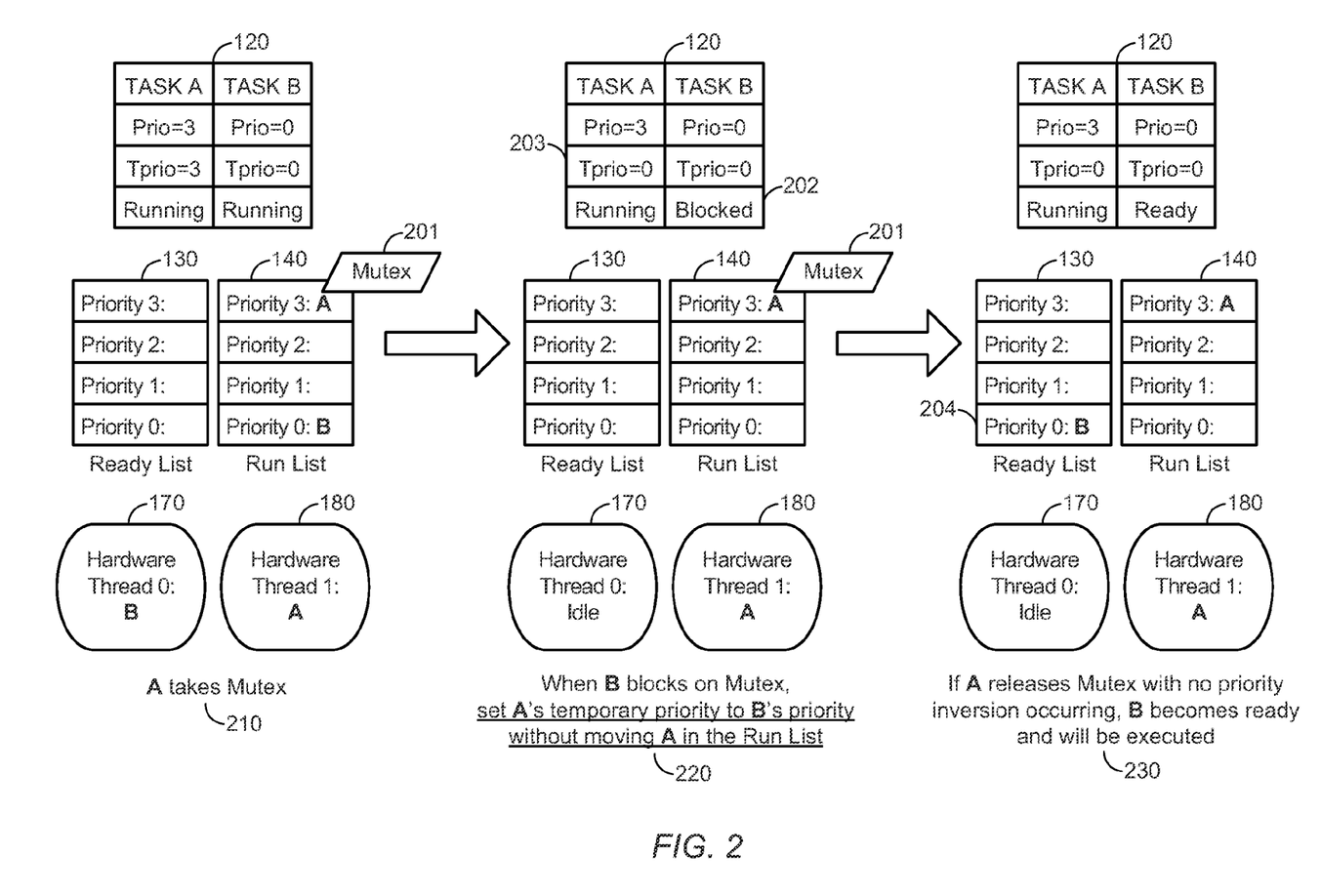
FIG. 2 is a diagram to illustrate a particular embodiment of operation at the system of FIG. 1 when priority inversion does not occur.

Various embodiments of operation at the system 100 are now described with reference to FIGS. 2-5. FIG. 2 depicts a particular embodiment of operation at the system 100 of FIG. 1 when priority inversion does not occur. In a first operational state 210, the tasks A and B may be running at the hardware threads 170 and 180. During execution, the task A may acquire a shared resource (e.g., a synchronization object such as a mutex or a semaphore). For example, the task A may acquire a mutex 201.

In a second operational state 220, the task B may block on the mutex 201, as illustrated in the task control blocks 120, at 202. For example, the task B may wish to read or write data to a portion of memory that is access-controlled by the mutex 201. The task B may issue a request for the mutex 201 to an operating system (e.g., the operating system 110 of FIG. 1). The operating system may determine that the task A holds the mutex 201, thereby prompting the task B to block. When the task B blocks, the first hardware thread 170 (hardware thread 0) may become idle and the task B may be removed from the run list 140. The task B may not be placed in the ready list 130, however, because the task B may not be ready for execution until the mutex 201 is released by the task A.

When the task B blocks on the mutex 201, a task scheduler (e.g., the task scheduler 150 of FIG. 1) may detect that a higher priority task (e.g., task B) has been prevented from executing by a lower priority task (e.g., task A). In response to the determination, the task scheduler may set a temporary priority of the preventing task to the priority of the prevented task. For example, the task scheduler may set the temporary priority of the task A to 0, as illustrated in the task control blocks 120, at 203.

Although the task scheduler proactively sets the temporary priority of the task A to the priority of the task B to mitigate priority inversion, priority inversion may not always occur. For example, the task A may release the mutex 201 before being preempted by other tasks, as illustrated in a third operational state 230. When the task A releases the mutex 201 in the course of executing at its normal priority, the task scheduler may add the task B to the ready list 140, as illustrated at 204. Since the mutex 201 is available, the task B may be scheduled for execution. Once the task A releases the mutex 201, the temporary priority of the task A is cleared (e.g., reset to 3) (not shown).

It will be appreciated that the priority inversion techniques disclosed herein may be fast and inexpensive in cases where no priority inversion actually occurs. For example, since the contents of the ready list 130 and the run list 140 are not modified, the cost of implementing priority inheritance may be limited to setting and resetting task A's temporary priority (e.g., two single-byte write operations on the task control block 120).

Figure 3:
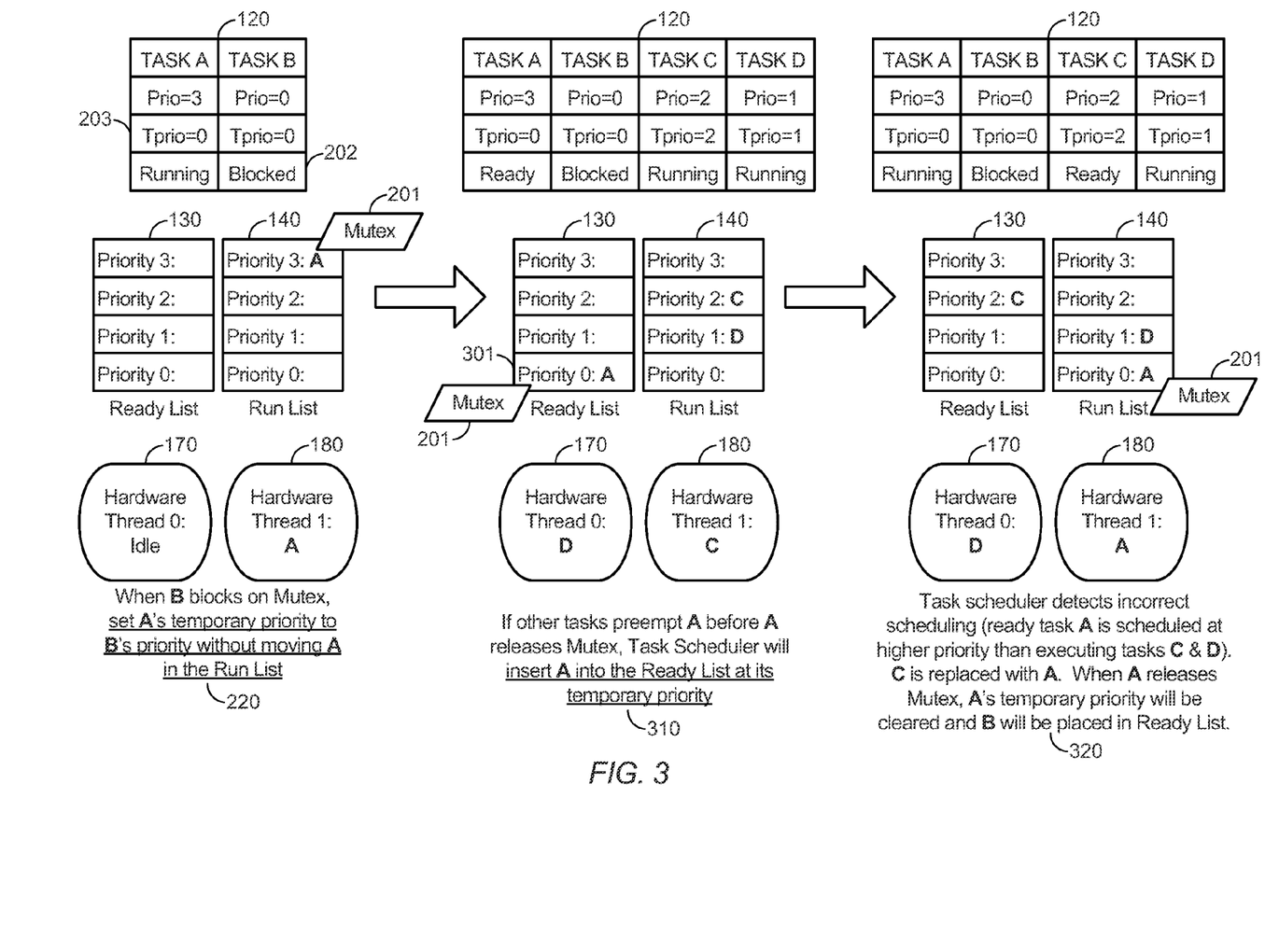
FIG. 3 is a diagram to illustrate a particular embodiment of operation at the system of FIG. 1 when priority inversion occurs.

FIG. 3 depicts an embodiment of operation at the system 100 of FIG. 1 when priority inversion occurs. Initially, the system 100 may be in the operational state 220 described and illustrated with reference to FIG. 2. Where the task B has blocked on the mutex 201 and the temporary priority of the task A has been set to 0.

In a fourth operational state 310, other tasks may preempt task A from execution before task A is able to release the mutex 201. For example, new tasks C and D, having priorities of 2 and 1, respectively, may be introduced into the system. Because the tasks C and D have higher priorities than the task A, the tasks C and D may execute at the hardware threads 170-180, thereby preempting task A. When a particular task is preempted, the task scheduler may place the particular task into the ready list 130. In accordance with the priority inversion techniques disclosed herein, however, the task A may be placed into the ready list 130 at its temporary priority of 0 (and not its regular priority of 3), as illustrated at 301.

In a fifth operational state 320, the task scheduler may detect that an incorrect scheduling condition is present in the system. For example, the task scheduler may detect that an incorrect scheduling condition exists since a task on the run list 140 (e.g., the task C having a priority of 2) has a lower priority than the temporary priority of the task A in the ready list 130. The task scheduler may take steps to remedy this condition, such as rescheduling the task A for execution at its temporary priority. For example, the task scheduler may preempt the task C (which has a lower priority than the task D) with the task A. Preempting the task C with the task A may include replacing the task C in the run list 110 with the task A and executing the task A at the second hardware thread 180. When the task A releases the mutex 201, the task A's temporary priority may be cleared and the task B may be placed into the ready list 130 (not shown).

Thus, in situations when priority inversion initially occurs, scheduling the preempted task at its temporary priority may remedy the priority inversion and enable a system to progress towards releasing a shared resource (e.g., the mutex 201).

Figure 4:
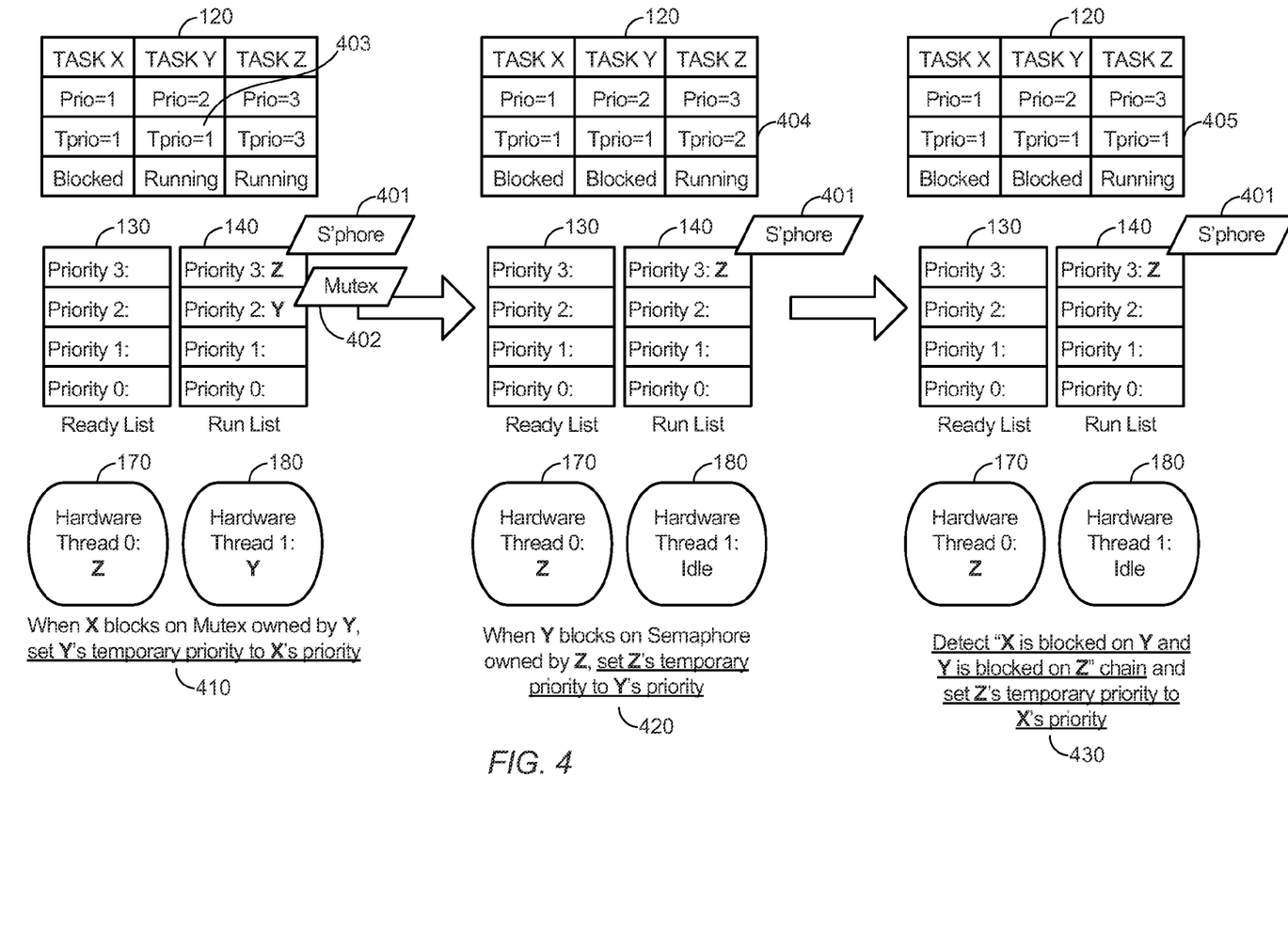
FIG. 4 is a diagram to illustrate a particular embodiment of operation at the system of FIG. 1 that includes recursive priority inheritance.

Priority inheritance as disclosed herein may also be implemented recursively. For example, FIG. 4 depicts an embodiment of operation at the system 100 of FIG. 1 that includes recursive priority inheritance.

In an initial operational state 410, three tasks X, Y, and Z may exist in the system. The task X may have a priority of 1 the task Y may have a priority of 2, and the task Z may have a priority of 3. The task Z may own a semaphore 401 and the task Y may own a mutex 402. If the task X blocks on the mutex 402 owned by the task Y, the temporary priority of the task Y may be set to the priority of the task X, as illustrated at 403. The tasks Y and Z may then execute at the hardware threads 170, 180 while the task X is blocked.

In a subsequent operational state 420, the task Y may block on the semaphore 401 owned by the task Z. To mitigate priority inversion, the task scheduler may set the temporary priority of the task Z to the priority of the task Y, as illustrated at 404, while the task Z continues to execute. This may result in a recursive chain of blocked tasks, where the task X is blocked, on the task Y and the task Y is blocked on the task Z. When such a chain exists, the task Z is not only blocking the task Y from executing, but also blocking the task X. Thus, in an operational state 430, the task scheduler may detect the recursive chain and may set the temporary priority of the task Z to the priority of the task X, as illustrated at 405. Elevating the task Z's temporary priority to the highest task priority in the chain may enable the system to progress towards the task X's execution, not only the task Y's execution.

Figure 5:
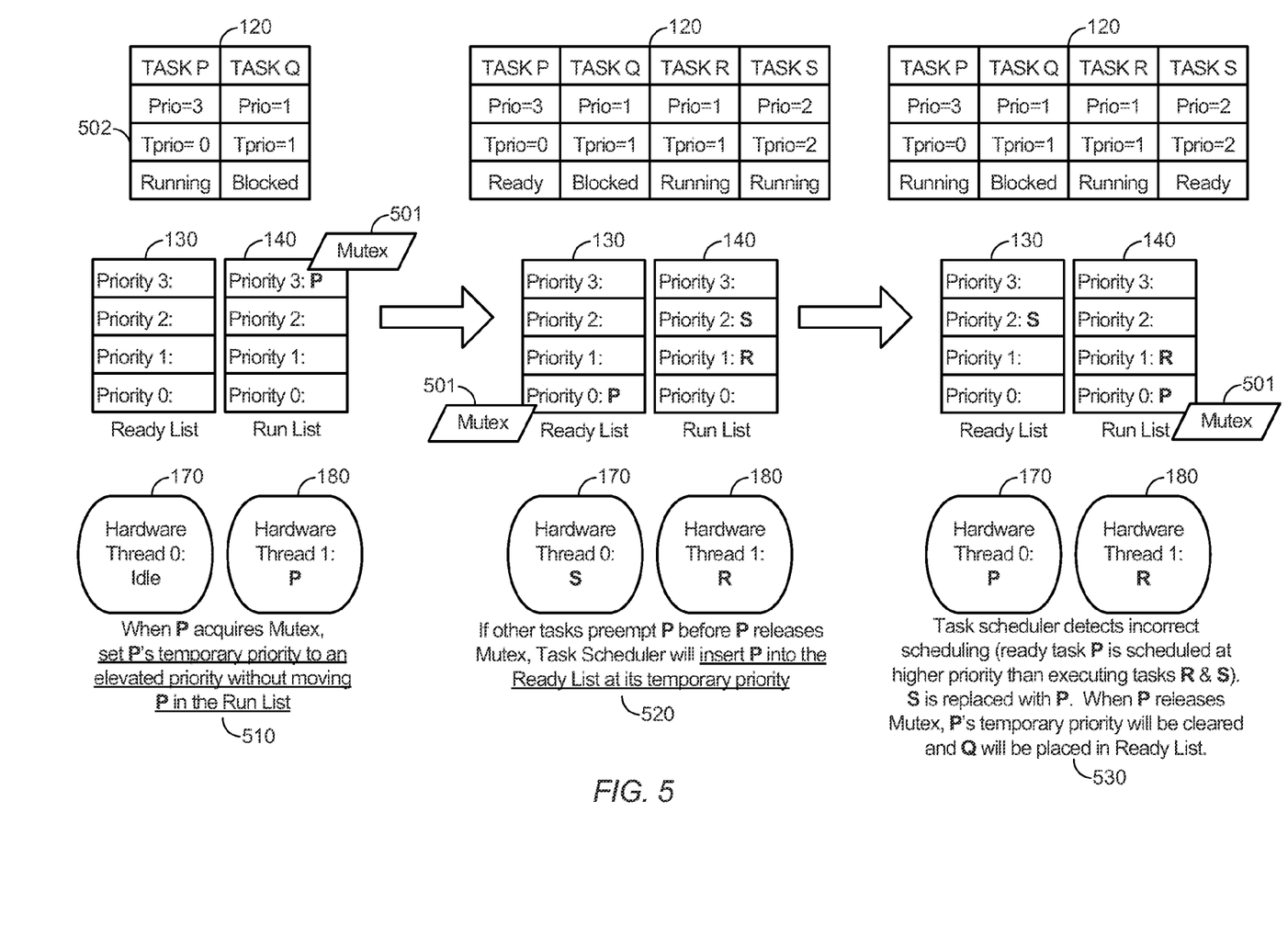
FIG. 5 is a diagram to illustrate another particular embodiment of operation at the system of FIG. 1 when priority inversion occurs.

In an alternate embodiment, instead of utilizing a form of priority inheritance, mitigating priority inversion as disclosed herein may utilize elevated priorities. For example, instead of "inheriting" the priority of the higher priority blocking task, the temporary priority of a lower priority task may instead be set to an elevated, priority "ceiling" when a mutex is acquired. FIG. 5 depicts an embodiment of operation at the system 100 of FIG. 1 that uses an elevated priority.

In an initial operational state 510, two tasks P and Q may exist. The task P may have a priority of 3 and the task Q may have a priority of 1. When the task P acquires a mutex 501, the temporary priority of the task P may be set to mitigate priority inversion. However, instead, of setting the temporary priority of the task P to the priority of a subsequent blocking task (e.g., task Q), the temporary priority of the task P may be set to some other elevated priority. For example, the temporary priority of the task P may be set to 0, as illustrated at 502. In a particular embodiment, the elevated priority is a priority "ceiling" that represents a highest possible task priority of the system.

When medium priority tasks R and S preempt the task P, as illustrated in operational state 520, the task scheduler may reschedule the task P at the elevated priority identified by the task P's temporary priority, as illustrated by operational state 530. In an illustrative embodiment, the task scheduler detects the preemption and performs the rescheduling as described and illustrated with reference to the operational states 310 and 320 of FIG. 3.

It will be appreciated that the "lazy" priority ceiling algorithm illustrated in FIG. 5 may be low-cost in the case where no priority inversion occurs, similar to the "lazy" priority inversion algorithm illustrated in FIGS. 2-3. In a particular embodiment, when a "lazy" priority ceiling is used instead of "lazy" priority inheritance, the task scheduler does not check for recursive task blocking as illustrated in FIG. 4, since the elevated priority is the highest possible task priority in the system.

Figure 6:
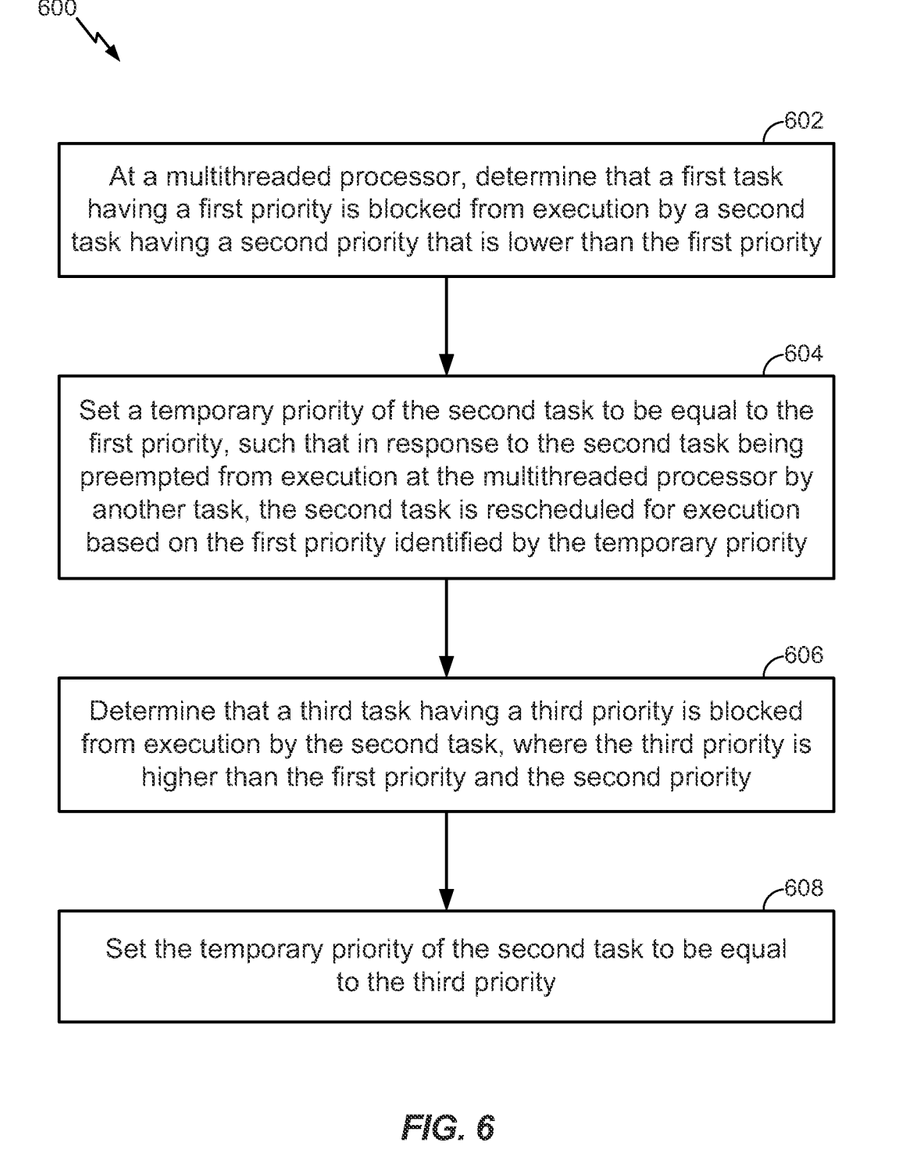
FIG. 6 is a flow diagram to illustrate a particular embodiment of a method of priority inheritance.

FIG. 6 is a flow diagram to illustrate a particular embodiment of a method 600 of priority inheritance. In an illustrative embodiment, the method 600 may be performed at the system 100 of FIG. 1 and may be illustrated with reference to FIG. 4.

The method 600 includes, at a multithreaded processor, determining that a first task having a first priority is blocked front execution by a second task having a second priority that is lower than the first priority, at 602. For example, in FIG. 4, it may be determined that the task Y having a priority of 2 is blocked from execution by the task Z having a priority of 3.

The method 600 also includes setting temporary priority of the second task to be equal to the first priority, at 604. The temporary priority is set such that in response to the second task being preempted from execution at the multithreaded processor by another task, the second task is rescheduled for execution based on the first priority identified by the temporary priority. For example, in FIG. 4, the temporary priority of the task Z may be set to the priority of the task Y, as illustrated at 404.

The method 600 further includes determining that a third task having a third priority is blocked from execution by the second task, at 606. The third priority is higher than both the first priority and the second priority. For example, in FIG. 4, the task X, having a priority of 1, may effectively be blocked from execution by the task Z.

The method 600 includes setting the temporary priority of the second task to be equal to the third priority, at 608. For example, in FIG. 4, the temporary priority of the task Z may be set to 1, as illustrated at 405.

It will be appreciated that the method 600 of FIG. 6 may enable a multithreaded system to avoid operating inefficiencies and potential deadlock associated with priority inversion. It will also be appreciated that the method 600 of FIG. 6 may apply to both typical priority inversion scenarios as well as more complex recursive priority inversion scenarios.

Figure 7:
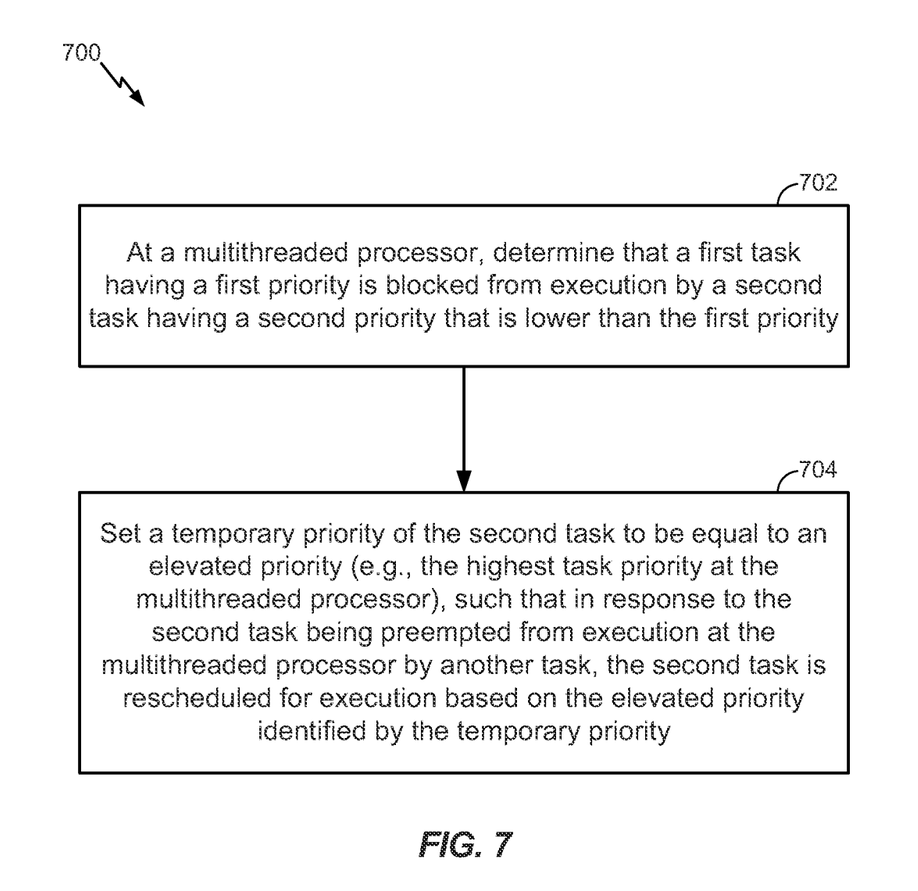
FIG. 7 is a flow diagram to illustrate particular embodiment of a method of using elevated priority.

FIG. 7 is a flow diagram to illustrate another particular embodiment of a method 700 of mitigating priority inversion using an elevated priority. In an illustrative embodiment, the method 700 may be performed at the system 100 of FIG. 1 and may be illustrated with reference to FIG. 5.

The method 700 includes, at a multithreaded processor, determining that a first task having a first priority is blocked from execution by a second task having a second priority that is lower than the first priority, at 702. For example, referring to FIG. 5, the task Q, having a priority of 1, may be blocked from execution by the task P, having priority of 3.

The method 700 also includes setting a temporary priority of the second task to be equal to an elevated priority, at 704. For example, the elevated priority may be a highest task priority at the multithreaded processor. The temporary priority is set such that in response to the second task being preempted from execution at the multithreaded processor by another task, the second task is rescheduled for execution based on the elevated priority identified by the temporary priority. For example, referring to FIG. 5, the temporary priority of the task P may be set to the elevated priority of 0, as illustrated at 502. If the task P is preempted, as illustrated by the operational state 520, the task P will be rescheduled at the elevated priority, as illustrated by the operational state 530.

It will be appreciated that the method 700 of FIG. 7 may enable a multithreaded system to avoid operating inefficiencies and potential deadlock associated with priority inversion. It will also be appreciated that although the method 700 of FIG. 7 illustrates use of an elevated priority, the method 700 may alternately use priority inheritance.

Figure 8:
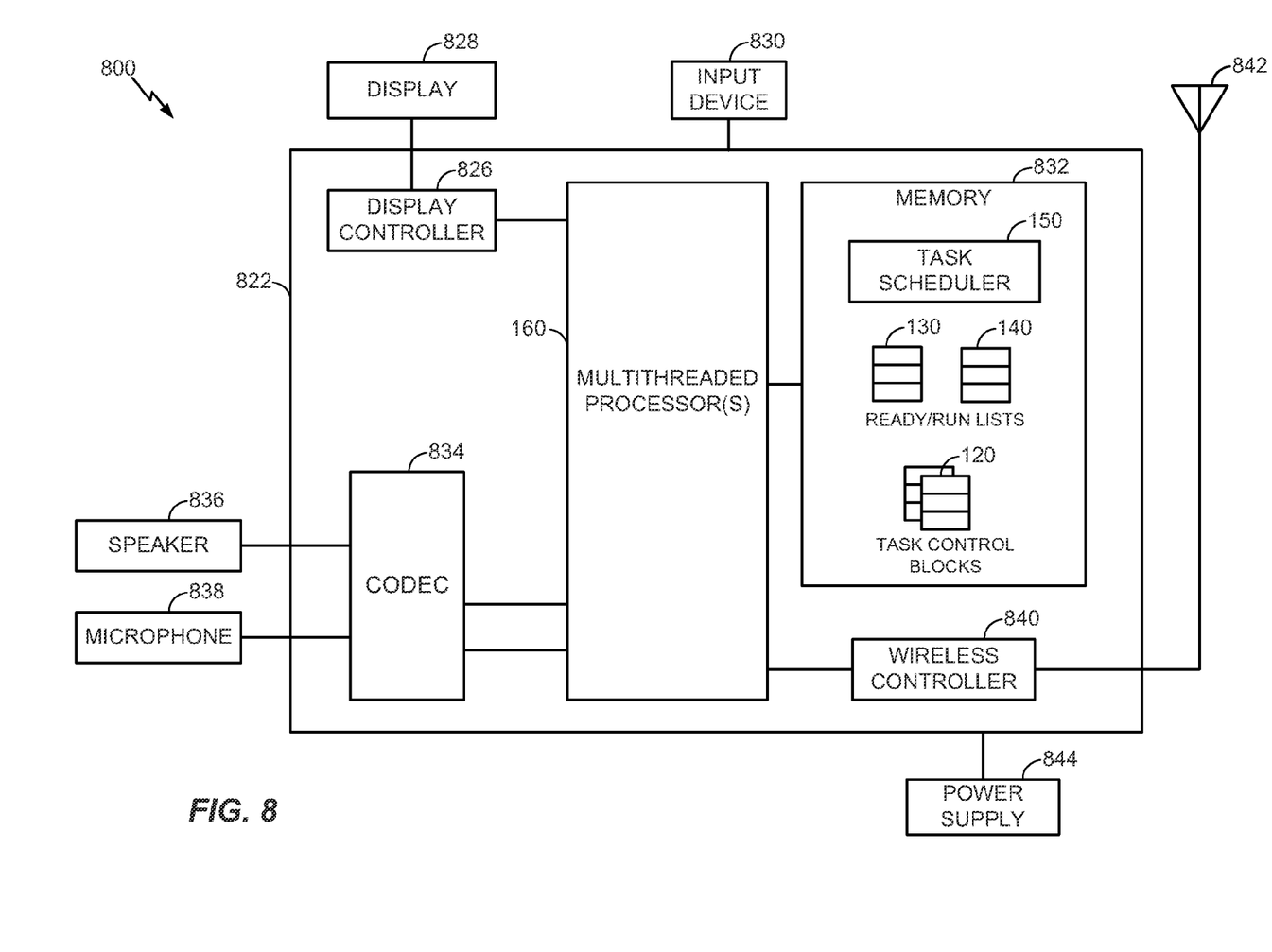
FIG. 8 is a diagram to illustrate a particular embodiment of an electronic device that implements priority inheritance and elevated priority.

FIG. 8 depicts a particular illustrative embodiment of an electronic device 800 into which the system 100 of FIG. 1 may be integrated. The device 800 may be an electronic device, such as a personal digital assistant (RDA), a wireless mobile device, a computing device, other type of device, or any combination thereof. The device 800 includes the one or more multithreaded processors 160 of FIG. 1.

A coder-decoder (CODEC) 834, a display controller 826, and a wireless controller 840 are coupled to the one or more multithreaded processors 160. The one or more multithreaded processors 160 are also coupled to a memory 832. For example, the memory 832 may be a non-transitory computer-readable medium storing executable instructions (not shown) that represent the real-time operating system 110 of FIG. 1 and that are executable to perform any of the methods described herein, including the disclosed priority inheritance and elevate priority techniques. The memory 832 may store scheduling data such as the task control blocks 120, the ready list 130, the run list 140, and the task scheduler 150 of FIG. 1. In a particular embodiment, the memory 832 includes random access memory (RAM), cache-based memory, register-based memory, or any combination thereof.

The display controller 826 is coupled to a display 828. A speaker 836 and a microphone 838 can be coupled to the CODEC 834. The wireless controller 840 can be coupled to a wireless antenna 842. In a particular embodiment, the multithreaded processor(s) 160, the display controller 826, the memory 832, the CODEC 834, and the wireless controller 840 are included in a system-in-package or system-on-chip device 822. In a particular embodiment, an input device 830 and a power supply 844 are coupled to the system-on-chip device 822. Moreover, in a particular embodiment, as illustrated in FIG. 8, the display 828, the input device 830, the speaker 836, the microphone 838, the wireless antenna 842, and the power supply 844 are external to the system-on-chip device 822. However, each of the display 828, the input device 830, the speaker 836, the microphone 838, the wireless antenna 842, and the power supply 844 can be coupled to a component of the system-on-chip device 822, such as an interface or a controller.

Thus, FIG. 8 depicts a particular embodiment of implementing "lazy" priority inheritance and "lazy" priority ceiling in an electronic device. The techniques disclosed herein may also be applicable to other electronic devices, such as desktop computers, laptop computers, audio players, video players, and navigation devices.

Those of skill would further appreciate that the various illustrative logical blocks, configurations, modules, circuits, and algorithm steps described in connection with the embodiments disclosed herein may be implemented as electronic hardware, computer software executed by a processing device such as a hardware processor, or combinations of both. Various illustrative components, blocks, configurations, modules, circuits, and steps have been described above generally in terms of their functionality. Whether such functionality is implemented as hardware or executable software depends upon the particular application and design constraints imposed on the overall system, Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in a non-transitory storage medium such as random access memory (RAM), magnetoresistive random access memory (MRAM), spin-torque transfer MRAM (STT-MRAM), flash memory, read-only memory (ROM), programmable read-only memory (PROW, erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device (e.g., a desktop computer or a laptop computer) or a user terminal (e.g., a portable wireless device).

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method, comprising:
    at a hardware-multithreaded processor, determining that a first task is blocked from execution by a second task, the first task having a first priority and the second task having a second priority that is lower than the first priority;
    setting a temporary priority of the second task to be equal to an elevated priority that is higher than the second priority, such that when the second task has the temporary priority and is preempted from execution at the hardware-multithreaded processor by another task, the second task is rescheduled for execution based on the temporary priority and when the second task has the temporary priority and is not preempted from execution at the hardware-multithreaded processor, the second task will be executed based on the second priority; and
    clearing the temporary priority of the second task in response to the second task releasing a synchronization object blocking the first task from execution.

2. The method of claim 1, further comprising:
    maintaining a ready list that identifies tasks that are ready to be executed at the hardware-multithreaded processor; and
    maintaining a run list that identifies tasks that are scheduled for execution at the hardware-multithreaded processor,
    wherein the temporary priority of the second task is set to the first priority without modifying contents of the ready list or the run list.

3. The method of claim 2, wherein rescheduling the second task for execution comprises:
    inserting the second task into the ready list at the temporary priority;
    detecting that the run list includes a third task having a lower priority than the temporary priority; and
    replacing the third task in the run list with the second task.

4. The method of claim 2, further comprising:
    determining that a third task has a third priority higher than the second priority, wherein the third priority is lower than the elevated priority, wherein the third task is in the ready queue, and wherein the second task is in the run queue; and
    in response to determining that the third task has the third priority, inserting the second task into the ready queue according to the temporary priority and inserting the third task into the run queue according to the third priority.

5. The method of claim 4, wherein inserting the third task into the run queue comprises scheduling the third task for execution at a second hardware thread.

6. The method of claim 1, further comprising:
    while executing the second task based on the second priority, determining that the second task is preempted from execution by a third task; and
    after the second task has been preempted by execution of the third task, executing the second task based on the temporary priority.

7. The method of claim 1, wherein the first task is scheduled to execute at a first hardware thread of the hardware-multithreaded processor, and wherein the second task is scheduled to execute at a second hardware thread of the hardware-multithreaded processor.

8. The method of claim 1, wherein the first task and the second task are executed by a real-time operating system executed by the hardware-multithreaded processor.

9. The method of claim 1, wherein the first task comprises a device task, a critical system task, or any combination thereof.

10. The method of claim 1, wherein the second task comprises a maintenance task, a background task, a profiling task, a user interface task, or any combination thereof.

11. The method of claim 1, wherein determining that the first task is blocked from execution by the second task comprises:
    receiving a request from the first task for a computing resource; and
    determining that the second task holds a synchronization object associated with the computing resource.

12. The method of claim 11, wherein the synchronization object comprises a mutex or a semaphore.

13. The method of claim 1, wherein the elevated priority is equal to the first priority.

14. The method of claim 1, further comprising:
    determining that a third task having a third priority is blocked from execution by the second task, wherein the third priority is higher than the first priority and the second priority; and
    setting the temporary priority of the second task to be greater than or equal to the third priority.

15. An apparatus, comprising:
    a hardware-multithreaded processor;
    a memory; and
    an operating system executable by the hardware-multithreaded processor to:
        determine that a first task is blocked from execution at the hardware-multithreaded processor by a second task, the first task having a first priority and the second task having a second priority that is lower than the first priority;
        set a temporary priority of the second task to be equal to an elevated priority that is higher than the second priority, such that when the second task has the temporary priority and is preempted from execution at the hardware-multithreaded processor by another task, the second task is rescheduled for execution based on the temporary priority and when the second task has the temporary priority and is not preempted from execution at the hardware-multithreaded processor, the second task will be executed based on the second priority; and
        clear the temporary priority of the second task in response to the second task releasing a synchronization object blocking the first task from execution.

16. The apparatus of claim 15, further comprising one or more additional hardware-multithreaded processors.

17. The apparatus of claim 15, further comprising:
a ready list stored at the memory, wherein the ready list identifies tasks that are ready to be executed at the hardware-multithreaded processor; and
a run list stored at the memory, wherein the run list identifies tasks that are scheduled for execution at the hardware-multithreaded processor;
wherein the operating system is further executable by the hardware-multithreaded processor to set the temporary priority of the second task to the first priority without modifying contents of the ready list or the run list.

18. The apparatus of claim 17, wherein rescheduling the second task for execution comprises:
inserting the second task into the ready list at the temporary priority;
detecting that the run list includes a task having a lower priority than the temporary priority; and
replacing the task in the run list with the second task.

19. The apparatus of claim 15, wherein the memory comprises a random access memory (RAM), a cache memory, a register-based memory, or any combination thereof.

20. An electronic device, comprising:
means for scheduling tasks for execution at a plurality of hardware threads;
means for storing scheduling data associated with the scheduled tasks;
means for determining that a first task is blocked from execution by a second task, the first task having a first priority and the second task having a second priority that is lower than the first priority; and
means for setting a temporary priority of the second task to be equal to an elevated priority that is higher than the second priority, such that when the second task has the temporary priority and is preempted from execution by another task, the means for scheduling tasks reschedules the second task for execution based on the elevated priority identified by the temporary priority and when the second task has the temporary priority and is not preempted from execution, the second task will be executed based on the second priority; and
means for clearing the temporary priority of the second task in response to the second task releasing a synchronization object blocking the first task from execution.

21. The electronic device of claim 20, further comprising means for executing the scheduled tasks, wherein the means for executing the scheduled tasks includes the plurality of hardware threads.

22. The electronic device of claim 21, wherein the scheduling data comprises:
a ready list that identifies tasks that are ready to be executed at the means for executing; and
a run list that identifies tasks that are scheduled for execution at the means for executing.

23. The electronic device of claim 22, wherein the temporary priority of the second task is set to the first priority without modifying contents of the ready list or the run list.

24. A computer-readable non-transitory storage medium comprising instructions that, when executed by a hardware-multithreaded processor, cause the hardware-multithreaded processor to:
determine that a first task is blocked from execution at the hardware-multithreaded processor by a second task, the first task having a first priority and the second task having a second priority that is lower than the first priority;
set a temporary priority of the second task to be equal to an elevated priority that is higher than the second priority, such that when the second task has the temporary priority and is preempted from execution at the hardware-multithreaded processor by another task, the second task is rescheduled for execution based on the temporary priority and when the second task has the temporary priority and is not preempted from execution at the hardware-multithreaded processor, the second task will be executed based on the second priority; and
clear the temporary priority of the second task in response to the second task releasing a synchronization object blocking the first task from execution.

25. The computer-readable non-transitory storage medium of claim 24, further comprising instructions that, when executed by the hardware-multithreaded processor, cause the hardware-multithreaded processor to:
maintain a ready list that identifies tasks that are ready to be executed at the hardware-multithreaded processor; and
maintain a run list that identifies tasks that are scheduled for execution at the hardware-multithreaded processor,
wherein the temporary priority of the second task is set to the elevated priority without modifying the ready list or the run list.

26. The computer-readable non-transitory storage medium of claim 25, wherein rescheduling the second task for execution comprises:
inserting the second task into the ready list at the temporary priority;
detecting that the run list includes a third task having a lower priority than the temporary priority; and
replacing the third task in the run list with the second task.

27. The computer-readable non-transitory storage medium of claim 24, wherein the elevated priority is a highest task priority at the hardware-multithreaded processor.

28. The computer-readable non-transitory storage medium of claim 24, wherein the elevated priority is equal to the first priority.

* * * * *